United States Patent
Bocharov et al.

(10) Patent No.: US 10,257,587 B2
(45) Date of Patent: Apr. 9, 2019

(54) INTEGRATING CONTINUOUS AND SPARSE STREAMING DATA

(71) Applicant: Microsoft Technology Licensing, LLC, Redmond, WA (US)

(72) Inventors: John A. Bocharov, Seattle, WA (US); Geqiang (Sam) Zhang, Redmond, WA (US); Krishna Prakash Duggaraju, Renton, WA (US); Lin Liu, Sammamish, WA (US); Anirban Roy, Kirkland, WA (US); Jack E. Freelander, Monroe, WA (US); Vishal Sood, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 15/243,134

(22) Filed: Aug. 22, 2016

(65) Prior Publication Data
US 2016/0360297 A1 Dec. 8, 2016

Related U.S. Application Data

(63) Continuation of application No. 12/612,685, filed on Nov. 5, 2009, now Pat. No. 9,438,861.
(Continued)

(51) Int. Cl.
*H04N 7/173* (2011.01)
*H04N 21/2183* (2011.01)
(Continued)

(52) U.S. Cl.
CPC ....... *H04N 21/858* (2013.01); *H04N 7/17318* (2013.01); *H04N 21/2183* (2013.01);
(Continued)

(58) Field of Classification Search
None
See application file for complete search history.

(56) References Cited

U.S. PATENT DOCUMENTS

| 6,298,482 B1 | 10/2001 | Seidman et al. |
| 6,698,020 B1 | 2/2004 | Zigmond et al. |

(Continued)

FOREIGN PATENT DOCUMENTS

WO    WO 2010117316 A1 * 10/2010 ........... H04L 65/605

OTHER PUBLICATIONS

"HTTP Streaming", Retrieved from <<http://www.peerapp.com/Data/Files/HTTP_Video_Streaming_Solution_Brief.pdf>>, Sep. 16, 2009, pp. 1-6.
(Continued)

*Primary Examiner* — Jonathan V Lewis
(74) *Attorney, Agent, or Firm* — Fiala & Weaver P.L.L.C.

(57) ABSTRACT

A sparse streaming system provides a first-class means for sparse metadata to be added to streaming media presentations and to be delivered using an integrated data channel that is cacheable using readily available HTTP-based Internet caching infrastructure for increased scalability. The sparse streaming system stores a reference to a sparse track within a continuous track. If a continuous fragment arrives at the client that refers to a sparse fragment that the client has not yet retrieved, then the client requests the sparse fragment. In addition, each sparse fragment may include a backwards reference to the sparse fragment created immediately prior. The references in the continuous fragments make the client aware of new sparse track fragments, and the backwards references in the sparse track fragments ensure that the client has not missed any intervening sparse track fragments.

20 Claims, 5 Drawing Sheets

Related U.S. Application Data (60) Provisional application No. 61/249,254, filed on Oct. 6, 2009.

(51) Int. Cl.
*H04N 21/2187* (2011.01)
*H04N 21/234* (2011.01)
*H04N 21/44* (2011.01)
*H04N 21/4722* (2011.01)
*H04N 21/845* (2011.01)
*H04N 21/858* (2011.01)

(52) U.S. Cl.
CPC ... *H04N 21/2187* (2013.01); *H04N 21/23418* (2013.01); *H04N 21/44016* (2013.01); *H04N 21/4722* (2013.01); *H04N 21/8456* (2013.01)

(56) References Cited

U.S. PATENT DOCUMENTS

| | | | |
|---|---|---|---|
| 7,167,181 B2* | 1/2007 | Duluk, Jr. | G06T 15/005 345/421 |
| 7,281,260 B2 | 10/2007 | Puente et al. | |
| 7,467,233 B2 | 12/2008 | Tsimelzon et al. | |
| 7,480,308 B1* | 1/2009 | Cohen | H04L 47/10 370/412 |
| 7,683,905 B1* | 3/2010 | Kirk | G06F 9/3836 345/506 |
| 7,835,398 B2* | 11/2010 | Denney | H04L 12/2801 370/389 |
| 8,019,196 B2* | 9/2011 | Takakuwa | G11B 27/034 386/225 |
| 8,286,213 B2* | 10/2012 | Seo | H04N 7/17318 725/114 |
| 8,341,688 B2* | 12/2012 | Ngo | H04N 7/17336 725/101 |
| 8,874,779 B2* | 10/2014 | Ma | H04N 21/44209 709/200 |
| 2001/0013125 A1 | 8/2001 | Kitsukawa et al. | |
| 2003/0028893 A1 | 2/2003 | Addington | |
| 2003/0035440 A1* | 2/2003 | Casaccia | H04L 1/0007 370/473 |
| 2004/0006575 A1* | 1/2004 | Visharam | H04N 21/23424 |
| 2004/0039838 A1 | 2/2004 | Gopalakrishnan | |
| 2004/0146285 A1* | 7/2004 | Matsui | G11B 27/005 386/244 |
| 2005/0188048 A1 | 8/2005 | Yuan et al. | |
| 2005/0267894 A1 | 12/2005 | Carnahan | |
| 2006/0156363 A1* | 7/2006 | Wu | H04N 21/234327 725/113 |
| 2006/0206889 A1* | 9/2006 | Ganesan | H04N 7/17318 717/169 |
| 2007/0040928 A1* | 2/2007 | Jung | H04N 1/2166 348/362 |
| 2007/0044010 A1 | 2/2007 | Sull et al. | |
| 2007/0061364 A1 | 3/2007 | Klein, Jr. | |
| 2007/0074195 A1* | 3/2007 | Liao | G06F 8/443 717/160 |
| 2007/0107010 A1 | 5/2007 | Jolna et al. | |
| 2007/0107013 A1* | 5/2007 | Seppala | H04N 21/235 725/39 |
| 2007/0124319 A1 | 5/2007 | Platt et al. | |
| 2007/0154163 A1 | 7/2007 | Cordray | |
| 2008/0120180 A1* | 5/2008 | Tseng | G06Q 30/02 725/34 |
| 2008/0267218 A1 | 10/2008 | Linnamaki et al. | |
| 2009/0199248 A1 | 8/2009 | Ngo et al. | |
| 2009/0300675 A1 | 12/2009 | Shkedi | |
| 2009/0307722 A1 | 12/2009 | Gross | |
| 2010/0194979 A1 | 8/2010 | Blumenschein et al. | |
| 2010/0235432 A1* | 9/2010 | Trojer | H04L 12/2861 709/203 |
| 2011/0060791 A1* | 3/2011 | Lee | G06Q 30/0603 709/203 |
| 2011/0096828 A1* | 4/2011 | Chen | H04N 21/23106 375/240.02 |
| 2012/0011270 A1* | 1/2012 | Priddle | H04L 65/605 709/231 |
| 2012/0180083 A1 | 7/2012 | Marcus | |

OTHER PUBLICATIONS

"Final Office Action Issued in U.S. Appl. No. 12/612,685", dated Apr. 7, 2014, 10 Pages.

"Non-Final Office Action Issued in U.S. Appl. No. 12/612,685", dated Apr. 16, 2015, 12 Pages.

"Non-Final Office Action Issued in U.S. Appl. No. 12/612,685", dated Mar. 29, 2013, 11 Pages.

"Non-Final Office Action Issued in U.S. Appl. No. 12/612,685", dated Dec. 4, 2013, 9 Pages.

"Notice of Allowance Issued in U.S. Appl. No. 12/612,685", dated May 9, 2016, 8 Pages.

Zambelli, Alex, "IIS Smooth Streaming Technical Overview", In Microsoft Silverlight, in Windows Server Internet Information services 7.0, Mar. 25, 2009, pp. 1-18.

\* cited by examiner

INTEGRATING CONTINUOUS AND SPARSE STREAMING DATA

CROSS-REFERENCE TO RELATED APPLICATIONS

The present application is a continuation of U.S. patent application Ser. No. 12/612,685, filed Nov. 5, 2009, which in turn claims priority to U.S. Provisional Patent Application No. 61/249,254 filed Oct. 6, 2009. The entirety of each of these applications is incorporated by reference herein.

BACKGROUND

Streaming media is multimedia that is constantly received by, and normally presented to, an end-user (using a client) while it is being delivered by a streaming provider (using a server). One problem with existing media streaming architectures is the tight coupling between server and client. A stateful connection between client and server creates additional server overhead, because the server tracks the current state of each client. This also limits the scalability of the server. In addition, the client cannot quickly react to changing conditions, such as increased packet loss, reduced bandwidth, user requests for different content or to modify the existing content (e.g., speed up or rewind), and so forth, without first communicating with the server and waiting for the server to adapt and respond. Often, when a client reports a lower available bandwidth, the server does not adapt quickly enough, causing breaks in the media to be noticed by the user on the client as packets that exceed the available bandwidth are not received and new lower bit rate packets are not sent from the server in time. To avoid these problems, clients often buffer data, but buffering introduces latency, which for live events may be unacceptable.

In addition, the Internet contains many types of downloadable media content items, including audio, video, documents, and so forth. These content items are often very large, such as video in the hundreds of megabytes. Users often retrieve documents over the Internet using Hypertext Transfer Protocol (HTTP) through a web browser. The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

Unfortunately, live media often cannot be cached using existing protocols, and each client requests the media from the same server or set of servers. In addition, when streaming media can be cached, it is often cached by specialized cache hardware, not existing and readily available HTTP-based Internet caching infrastructure. The lack of caching limits the number of parallel viewers and requests that the servers can handle, and limits the attendance of a live event. The world is increasingly using the Internet to consume up to the minute live information, such as the record number of users that watched live events such as the opening of the 2008 Olympics via the Internet. The limitations of current technology are slowing adoption of the Internet as a medium for consuming this type of media content.

Many video solutions on the Internet involve the ability to deliver text and data that is synchronized to the video's timeline. For example, the data may include closed captions, captions, advertising insertion, and play-by-play captioning. Existing solutions to this problem have used provisions in media formats that allow custom data to be embedded in the headers, and workflows that use a different mechanism for delivery of the data out-of-band. These solutions do not work well for pull content, where a client regularly requests data from one or more servers. With pull content, the client has to be informed of what content to request, which can be particularly difficult for sparse or sporadic content that is only occasionally included in a stream. Unlike video or audio data, which the client can simply request on a routine schedule (e.g., every two seconds), sparse data such as an advertisement may be available irregularly and at much broader intervals (e.g., every 15 minutes).

SUMMARY

A sparse streaming system is described herein that provides a first-class means for sparse metadata to be added to streaming media presentations and to be delivered using an integrated data channel that is cacheable using readily available HTTP-based Internet caching infrastructure for increased scalability. The sparse streaming system typically includes at least one continuous streaming track and at least one sparse streaming track. The sparse streaming system stores a reference to the sparse track within the continuous track. If a continuous fragment arrives at the client that refers to a sparse fragment that the client has not yet retrieved, then the client requests the sparse fragment. In addition, each sparse fragment may include a backwards reference to the sparse fragment created immediately prior. The client can use the reference to follow a chain of backwards references until the client reaches a sparse fragment that the client has already retrieved. In this way, the references in the continuous fragments make the client aware of new sparse track fragments, and the backwards references in the sparse track fragments ensure that the client has not missed any intervening sparse track fragments. Thus, the sparse streaming system provides a way for the client to receive all of the fragments of a sparse track, even when sparse track fragments are not created with any regularity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A sparse streaming system is described herein that provides a first-class means for sparse metadata to be added to streaming media presentations and to be delivered using an integrated data channel that is cacheable using readily available HTTP-based Internet caching infrastructure for increased scalability and viewing by many clients. The system described is appropriate for live events or on-demand events that have already concluded. The sparse streaming system typically includes at least one continuous streaming track and at least one sparse streaming track. For example, the continuous streaming track may include audio, video, or other data that a client requests fragments (or chunks) of from a server with a regular cadence (e.g., every two seconds). The sparse track may include sporadic data, such as closed captions, commentary, or advertisements that the client requests irregularly.

The sparse streaming system stores information about the sparse track within the continuous track. For example, the system may include a reference within each fragment of the continuous streaming track to the last known fragment of the sparse streaming track. The client can use the reference to determine if the client has requested the latest sparse streaming fragment. If a continuous fragment arrives at the client that refers to a sparse fragment that the client has not yet retrieved, then the client requests the sparse fragment. In addition, each sparse fragment may include a backwards reference to the sparse fragment created immediately prior. The client can use the reference to follow a chain of backwards references until the client reaches a sparse fragment that the client has already retrieved. In this way, the references in the continuous fragments make the client aware of new sparse track fragments, and the backwards references in the sparse track fragments ensure that the client has not missed any intervening sparse track fragments. Thus, the sparse streaming system provides a way for the client to receive all of the fragments of a sparse track, even when sparse track fragments are not created with any regularity. In addition, because each fragment (whether of the continuous data stream or the sparse data stream) is available at a well-known Uniform Resource Locator (URL) or other identifier, each fragment is cacheable by existing Internet caching infrastructure to reduce the burden on one or more servers and thereby allow more clients to view the streaming presentation.

In some embodiments, the sparse streaming system uses a particular data transmission format between the server and client. The client requests fragments of media from a server that include a portion of the media. For example, for a 10-minute file, the client may request 2-second or smaller fragments. Note that unlike typical streaming where the server pushes data to the client, in this case the client pulls media fragments from the server. In the case of a live stream, the server may be creating the media on the fly and producing fragments to respond to client requests. Thus, the client may only be several fragments behind the server in terms of how fast the server creates fragments and how fast the client requests fragments.

Each fragment contains metadata and media content. The metadata may describe useful information about the media content, such as the bit rate at which the media content was encoded, where the media content fits into a larger media element (e.g., this fragment represents offset 1:10 in a 10-minute video clip), the codec used to encode the media content, and so forth. The client uses this information to place the fragment into a storyboard of the larger media element and to properly decode and playback the media content.

Figure 1:
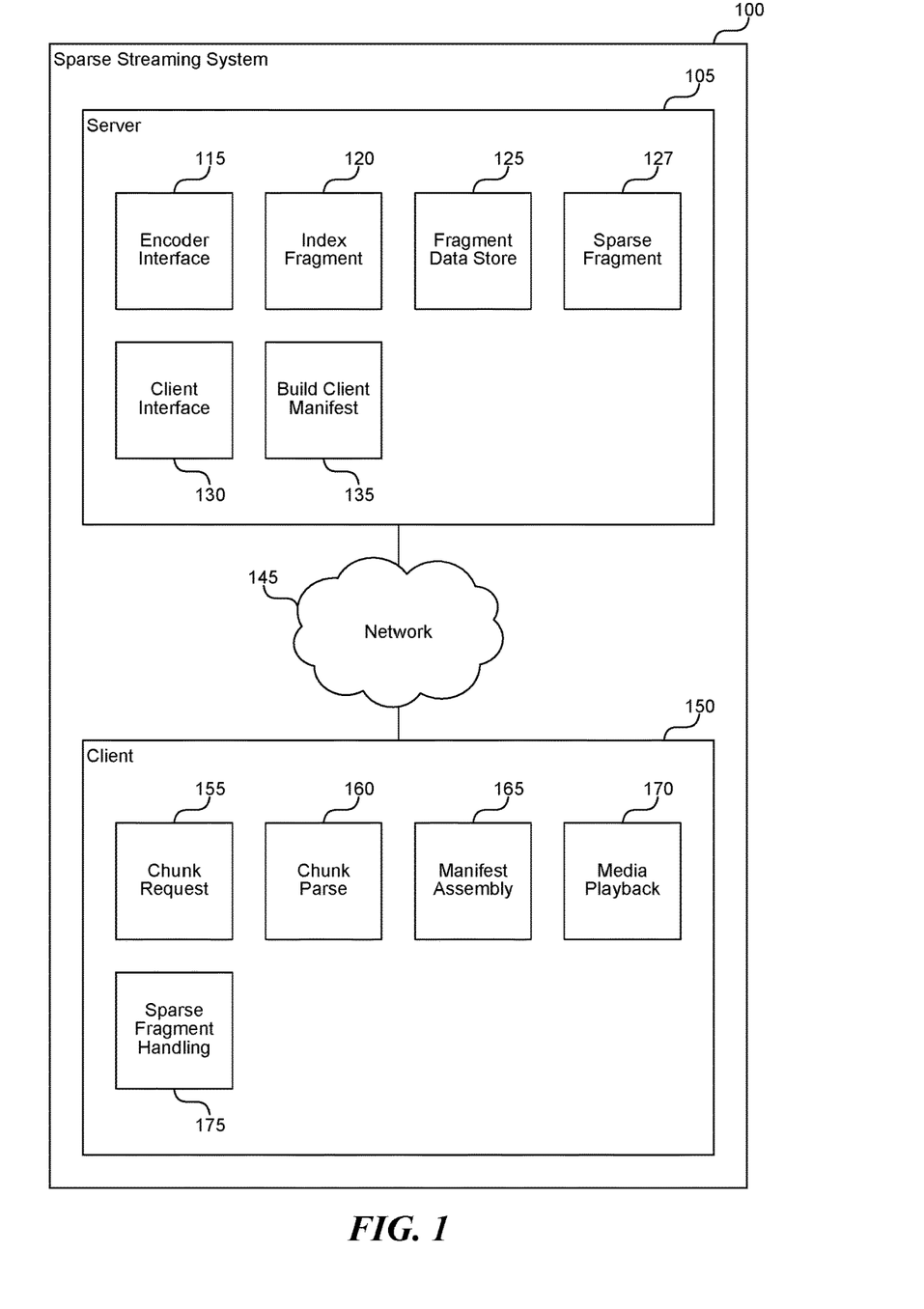
FIG. 1 is a block diagram that illustrates components of the sparse streaming system, in one embodiment.

FIG. 1 is a block diagram that illustrates components of the sparse streaming system, in one embodiment. The sparse streaming system 100 includes at least one server 105 and at least one client 150 connected by a network 145, such as the Internet. The server 105 includes an encoder interface component 115, an index fragment component 120, a fragment data store 125, a sparse fragment component 127, a client interface component 130, and a build client manifest component 135. Each of these components is described in further detail herein.

The encoder interface component 115 provides an interface between the system 100 and one or more encoders that provide encoded media data. The encoders may push data to the system 100 using common network protocols. For example, the encoders may use an HTTP POST request to provide encoded media data to the system 100. The encoders may each use a distinguished URL that specifies the encoder that is the source of the encoded media data, which the server may match to the information received by the register event component 110 when the media event was registered.

The encoder interface component 115 may specify a particular format for received encoded media data, such as an MP4 or other media container (e.g., MKV). The MP4 container format allows multiple types of data to be associated in a single file. The individual data that makes up an MP4 container is called a box, and each box typically has a label that identifies the type of data stored in the box. Encoders may place metadata information in the boxes such as the type of encoding used to encode the encoded media data, as well as the encoded media data itself.

The system 100 may configure encoders to lower overall latency produced by the system. For example, the system 100 may configure encoders not to include B-frames in streams so that the decoder can more quickly decode frames without waiting for subsequent frames to which B-frames would refer. In addition, the system 100 may instruct encoders to produce fragments that include less than a whole GOP, so that the encoder can push fragments to the server 105 more quickly.

The index fragment component 120 creates and maintains an index table of fragments received from various encoders. Because the system 100 is receiving media fragments on an on-going basis during an event from potentially many encoders, the system 100 uses the index table to keep track of what media fragments have been received and from which encoders (or in which formats). Each encoder may use a common method for identifying media fragments (e.g., a time stamp using a synchronized clock) so that the index fragment component 120 can correlate fragments from different encoders that represent the same period in a live event. In this way, the system 100 can detect when media fragments are missing and can provide clients with manifest information about available media fragments.

The fragment data store 125 stores received media fragments and the created index table of fragments to provide to clients in response to received client requests. The fragment data store may include a database, disk drive, or other form of data storage (e.g., a Storage Area Network (SAN) or a cloud-based storage service).

The sparse fragment component 127 receives sparse fragments from one or more sources and prepares the fragments for retrieval by clients. The sparse fragment component 127 may receive sparse data from a variety of sources and aggregate the data or make each set of data available as a separate stream. For example, announcers viewing a live sporting event may push a button or send data in some other manner to a server that indicates when a player has scored a goal or another significant game event has occurred. The announcers may also provide commentary associated with the sporting event presentation. As another example, the announcers or another party may mark points within the sporting event that are appropriate breaks for advertising (e.g., commercials). The sparse fragment component 127 collects these events and makes them available in association with the continuous video and/or audio presentation. In addition, the sparse fragment component 127 may prepare the fragments for retrieval by associating each sparse fragment with at least one continuous fragment and by associating sparse fragments with one another as described further herein.

The client interface component 130 receives client requests for media fragments and provides manifest data and media fragments to clients. When a client initially connects to the system 100, the client may send a request for a client manifest. The client interface component 130 invokes the build client manifest component 135 to create a manifest that includes information about the encodings available from the system 100, and fragments stored by the system 100 up to the current time based on the index table. The client can use this information either to begin requesting ongoing live fragments, or to skip backwards in time to earlier portions of a presentation. The client can use this technique, for example, if the client joins a live event that is already in progress and wants to catch up with the previous portions of the event.

The build client manifest component 135 builds a manifest to satisfy a client request that includes information about each of the encodings available from the system 100 and fragments stored by the system 100 up to the current time. The build client manifest component 135 also provides a manifest to include with each media fragment that provides information to the client about the current media fragment as well as potentially subsequent fragments. By combining the initially received manifest with subsequent manifests provided with each media fragment, the client can build an up to date manifest that includes complete information about the media event from the start up until the current time. When the media event completes, the client has a complete storyboard of the media event that the client can use for on-demand viewing of the media event.

In some embodiments, the client interface component 130 responds to client requests for available fragments without waiting for subsequent fragments from which to include information with the current fragment. The client can request subsequent fragments by referencing the current fragment. For example, if the client last requested a fragment at time 1000, and wants the subsequent fragment, the client may send a request to get the fragment following the fragment at time 1000. In this way, the server can send fragments without introducing additional latency by waiting for subsequent fragments before sending a fragment.

The client 150 includes a chunk request component 155, a chunk parsing component 160, a manifest assembly component 165, a media playback component 170, and a sparse fragment handling component 175. Each of these components is described in further detail herein.

Figure 2:
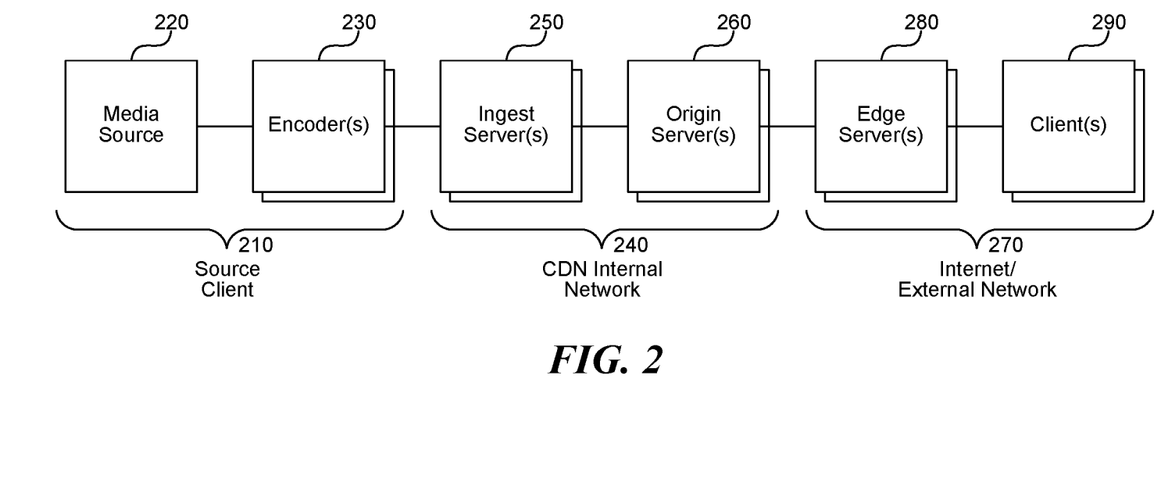
FIG. 2 is a block diagram that illustrates an operating environment of the sparse streaming system using Microsoft Windows and Microsoft Internet Information Server (IIS), in one embodiment.

The chunk request component 155 makes requests from the client for individual media chunks from the server. As shown in FIG. 2, the client's request may pass first to an edge server (e.g., an Internet cache), then to an origin server, and then to an ingest server. At each stage, if the requested data is found, then the request does not go to the next level. For example, if the edge server has the requested data, then the client receives the data from the edge server and the origin server does not receive the request. Each chunk may have a URL that individually identifies the chunk. Internet cache servers are good at caching server responses to specific URL requests (e.g., HTTP GET). Thus, when the first client calls through to the server 105 to get a chunk, the edge servers cache that chunk and subsequent clients that request the same chunk may receive the chunk from the edge server (based on the cache lifetime and server time to live (TTL) settings). The chunk request component 155 receives the chunk and passes it to the chunk parsing component 160 for interpretation. The chunk request component 1550 may request chunks by referencing a previous chunk (e.g., give me the chunk after chunk N).

The chunk parsing component 160 interprets the format of a media chunk received by the chunk request component 155 and separates the chunk into its component parts. Typically, the chunk includes a header portion containing metadata, and a data portion containing media content. The chunk parsing component provides the metadata to the manifest assembly component 165 and the media content to the media playback component 170. The media content may include mixed media types, such as video and audio data related to a presentation.

The manifest assembly component 165 builds a manifest that describes the media element to which received media content belongs. Large media files that clients download as a whole (i.e., not streamed) often include a manifest describing the whole file, the codecs and bit rates used to encode various portions of the file, markers about meaningful positions with the file, and so forth. During streaming, particularly live content, a server 105 cannot provide a complete manifest because the event is still ongoing. Thus, the server 105 provides as much of the manifest as it can through the metadata in the media chunks. The server 105 may also provide an application-programming interface (API), such as a predefined URL, for the client to request the manifest up to the current point in the media stream. This can be useful when the client 150 joins a live, streamed event after the event is already in progress. The manifest allows the client 150 to request previously streamed portions of the media element (e.g., by rewinding), and the client 150 continues to receive new portions of the manifest through the metadata of the streamed media chunks.

The manifest assembly component 165 builds a manifest similar to that available for a complete media file. Thus, as the event proceeds if the user wants to skip backwards in the media (e.g., rewind or jump to a particular position), then skip forward again, the user can do so and the client 150 uses the assembled manifest to find the appropriate chunk or chunks to playback to the user. When the user pauses, the system 100 may continue to receive media chunks (or only the metadata portion of chunks based on a distinguished request URL), so that the manifest assembly component 165 can continue to build the manifest and be ready for any user requests (e.g., skip to the current live position or play from the pause point) after the user is done pausing. The client-side assembled manifest allows the client 150 to play the media event back as on-demand content as soon as the event is over, and to skip around within the media event as it is going on.

The media playback component 170 plays back received media content using the client hardware. The media playback component 170 may invoke one or more codecs to interpret the container within which the media content is transported and to decompress or otherwise decode the media content from a compressed format to a raw format (e.g., YV12, RGBA, or PCM audio samples) ready for playback. The media playback component 170 may then provide the raw format media content to an operating system API (e.g., Microsoft DirectX) for playback on local computer system sound and video hardware, such as a display and speakers. The server 105 can influence latency on the client 150 by the encoding used. For example, encodings that include B-frames may cause the client to buffer received data longer before playing it back. By encoding video data without B-frames, the server can cause the client to playback video with less latency.

The sparse fragment handling component 175 identifies one or more sparse tracks associated with a particular media presentation and retrieves sparse fragments of the sparse track. Each continuous fragment may include a reference to the most recently created sparse fragment. For example, the sparse fragments may be identified by a time stamp and each continuous fragment may contain the timestamp of the most recent sparse fragment. If the client 150 receives a continuous fragment that references a sparse fragment that the client 150 has not previously retrieved, then the client 150 requests the sparse fragment from the server 105. The sparse fragment may reference other previous sparse fragments that the client 150 has not received, and the client 150 may request those fragments as well, as described further herein.

The computing device on which the sparse streaming system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 2 is a block diagram that illustrates an operating environment of the sparse streaming system using Microsoft Windows and Microsoft Internet Information Server (IIS), in one embodiment. The environment typically includes a source client 210, a content delivery network 240, and an external network 270. The source client is the source of the media or live event. The source client includes a media source 220 and one or more encoders 230. The media source 220 may include cameras each providing multiple camera angles, microphones capture audio, slide presentations, text (such as from a closed captioning service), images, and other types of media. The encoders 230 encode the data from the media source 220 in one or more encoding formats in parallel. For example, the encoders 230 may produce encoded media in a variety of bit rates.

The content delivery network 240, where the sparse streaming system operates, includes one or more ingest servers 250 and one or more origin servers 260. The ingest servers 250 receive encoded media in each of the encoding formats from the encoders 230 and create a manifest describing the encoded media. The ingest servers 250 may create and store the media fragments described herein or may create the fragments on the fly as they are requested. The ingest servers 250 can receive pushed data, such as via an HTTP POST, from the encoders 230, or via pull by requesting data from the encoders 230. The encoders 230 and ingest servers 250 may be connected in a variety of redundant configurations. For example, each encoder may send encoded media data to each of the ingest servers 250, or only to one ingest server until a failure occurs. The origin servers 260 are the servers that respond to client requests for media fragments. The origin servers 260 may also be configured in a variety of redundant configurations.

In some embodiments, the ingest servers 250 comprise one or more servers dedicated to ingesting encoder media streams. An administrator or content author may create a publishing point that defines a URL at which clients of the ingest servers 250 can find a particular media element (e.g., a live event). For example, using IIS, the administrator may publish a URL "http://ingserver/pubpoint.isml." The publishing point is used by the encoders 230 to provide new media data to the ingest servers 250 and by the origin servers 260 to request media data from the ingest servers 250. Each encoder may use a distinguished URL to connect to the ingest servers 250 so that the ingest servers 250 can detect different encodings of the same data. For example, based on the URL in the previous example, an encoder may send an HTTP POST to provide media data to the ingest server using the URL "http://ingserver/pubpoint.isml/Streams(stream1)." The ingest servers 250 store the received data for later retrieval by clients of the ingest servers 250 (e.g., the origin servers 260). The POST may contain various types of media formats, such as an MP4 container. An MP4 container contains various types of information, called boxes, that are typically labeled with a four-letter code, such as "ftyp" to describe the type of encoding used and "moov" to contain audiovisual data. Whether using MP4 or other container formats, the encoder may add additional boxes or information to the stream, such as a "ManifestBox" that contains a manifest describing the media element.

When the ingest servers 250 receive a request for data, the ingest servers 250 provide the data stored earlier. The ingest servers 250 may support several types of requests, including a request for encoder stream manifest that identifies the available encoder streams and a request for data from a specific stream (including portions of the stream data). The type of request may be identified by the URL of the request. For example, when the ingest servers 250 receive the URL "http://ingserver/pubpoint.isml/StreamManifest," the ingest servers 250 return an encoder manifest that contains identifiers for each available encoder. When the ingest servers 250 receives the URL "http://ingserver/pubpoint.isml/Streams(stream1)," the ingest servers 250 send a corresponding media stream for the encoder associated with the identifier "Encoder1" in response. The response may include the MP4 data, such as the cached "ftyp," "ManifestBox," and "moov" boxes described above followed by media fragments in a FIFO buffer. The ingest servers 250 may also receive partial data requests (e.g., during failover scenarios) of the form "http://ingserver/pubpoint.isml/Streams (stream1)/StartTime(12345678)," that cause the ingest servers 250 to skip sending "ftyp," "ManifestBox," and "moov" boxes and to try to start from the media fragment that is closest to the specified timestamp.

The origin servers 260 receive requests for media streams from media clients and retrieve requested media streams from one or more ingest servers 250. Like the ingest servers 250, an administrator or content author registers a publishing point on the origin server, and then associates the ingest servers 250 and/or encoder URLs with the publishing point. The origin servers 260 may first request (e.g., using an HTTP GET request) a manifest from the ingest servers 250 that describes the available streams. The origin server then submits separate requests for each encoder stream to the ingest server, and the ingest server responds with the requested media stream as received from the encoder.

The origin servers 260 may separately receive manifest information about the media stream and media fragments that represent parts of a larger media element being provided by the media stream. The origin servers 260 build an index of each fragment received from each stream based on a timestamp or other identifier provided by each encoder that allows the origin servers 260 to correlate data from each encoder. The origin servers 260 may build their own MP4 container or other storage format from the received data from which to respond to media client requests. By building a file of a known format from a live event, the origin server may be able to provide a unified download of a media file quickly after the event.

When the origin servers 260 receive a media client request, the origin servers 260 generate a client manifest by appending the index that the server has built to the static stream information received from the encoder manifest(s). If there are multiple streams, then the origin servers 260 merge the stream manifests into a comprehensive client manifest. This allows the client to be selective in which encoding type the client requests without obtaining further information from the origin servers 260. The server provides the manifest to the client using a standard response type that can be cached by existing Internet infrastructure, such as an HTTP response. Because the manifest data may change over time, the server may set a short cache timeout value (e.g., time to live (TTL)) on the manifest response.

The external network 270 includes edge servers 280 and other Internet (or other network) infrastructure and clients 290. When a client makes a request for a media fragment, the client addresses the request to the origin servers 260. Because of the design of network caching, if one of the edge servers 280 contains the data, then that edge server may respond to the client without passing along the request. However, if the data is not available at the edge server, then the edge server forwards the request to one of the origin servers 260. Likewise, if one of the origin servers 260 receives a request for data that is not available, the origin server may request the data from one of the ingest servers 250.

Figure 3:
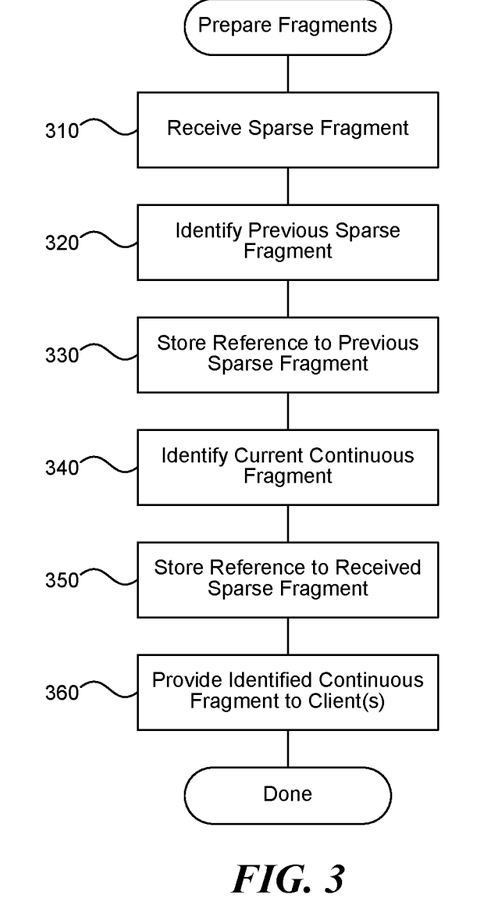
FIG. 3 is a flow diagram that illustrates processing of the sparse fragment component of a server, in one embodiment.

FIG. 3 is a flow diagram that illustrates processing of the sparse fragment component of a server, in one embodiment. The component is invoked to process sparse track data made available to clients from one or more server. Beginning in block 310, the component receives a current sparse track fragment. For example, the component may receive the fragment from an encoder or other data source, such as a client from which a sports announcer connects to the server. Continuing in block 320, the component identifies a previous sparse fragment from the same track. For example, the data source may have sporadically provided sparse fragments and the component identifies the fragment that preceded the current sparse fragment. Continuing in block 330, the component stores a reference to the identified previous sparse track fragment in the received current sparse track fragment. The references in each sparse fragment form a reverse list that a client can use to identify previous sparse fragments from a current sparse fragment. The reference may include a timestamp, URL, or other identifier for locating the fragment to which the reference refers.

Continuing in block 340, the component identifies a current continuous track fragment associated with the sparse track. For example, the component may identify a video stream track associated with a sparse text data stream. Continuing in block 350, the component stores a reference to the received current sparse track fragment in the identified current continuous track fragment. Each continuous track fragment points to the most recently received sparse track fragment. In this way, receiving any continuous track fragment is sufficient to allow the client to follow the reverse list of sparse track fragments. Continuing in block 360, the component provides the identified current continuous track fragment including the stored reference to the received current sparse track fragment to at least one client. For example, the client may request continuous track fragments using periodic HTTP GET requests to a server. After block 360, these steps conclude.

Figure 4:
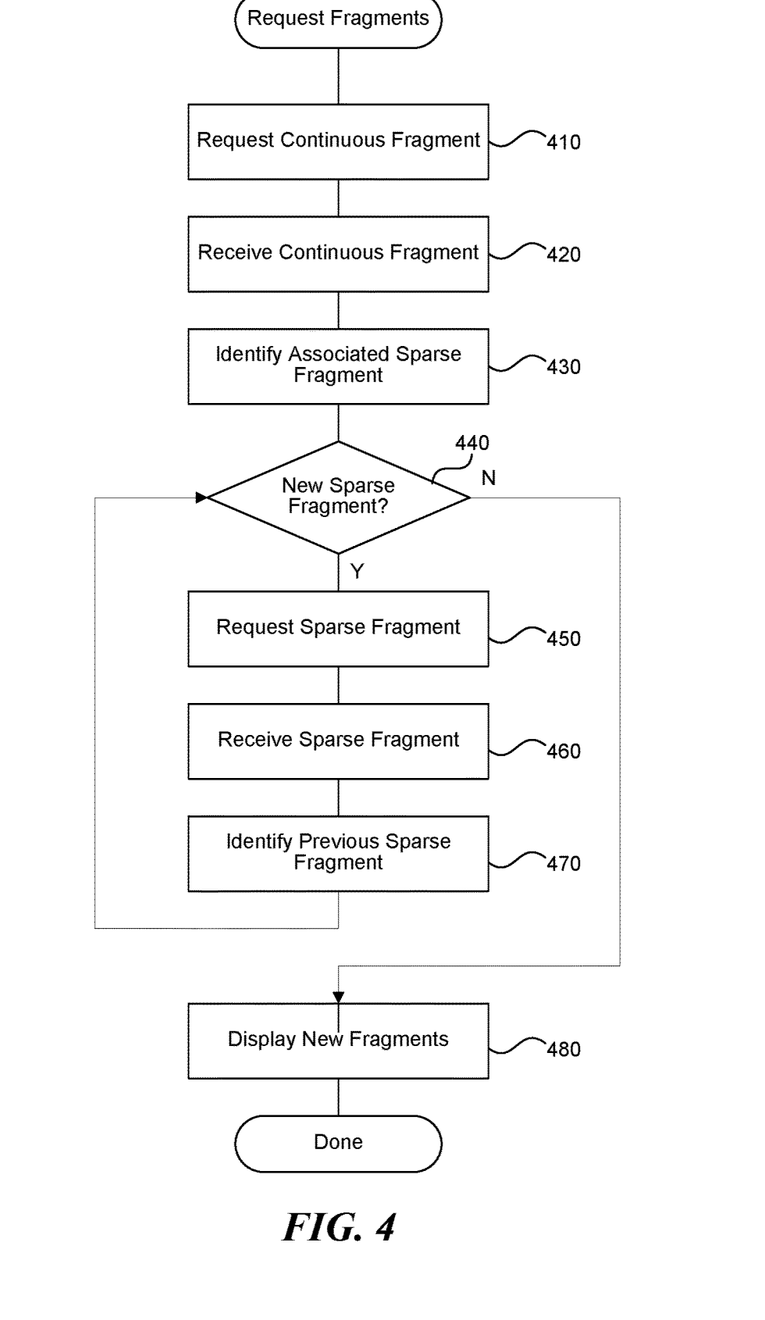
FIG. 4 is a flow diagram that illustrates processing of the sparse fragment handling component of a client, in one embodiment.

FIG. 4 is a flow diagram that illustrates processing of the sparse fragment handling component of a client, in one embodiment. The component is invoked as a client processes a streaming media presentation to request fragments from a server. Beginning in block 410, the component requests a continuous track fragment associated with the streaming media presentation. For example, the client may regularly request continuous track fragments according to a specified time interval, quality of service (QoS) data, or other parameters. Continuing in block 420, the component receives the requested continuous track fragment. Each fragment may be provided at a given URL for which the server provides a response that can be cached by Internet HTTP cache servers.

Continuing in block 430, the component identifies a reference to a sparse track fragment associated with the continuous track fragment. For example, an HTTP "Pragma" header associated with the continuous track fragment response may reference any sparse data tracks associated with the continuous data track. Continuing in decision block 440, if the identified sparse track fragment has previously been received by the client, then the component jumps to block 480, else the component continues at block 450. For example, the client may receive an identifier for each track, such as a track name and timestamp, that allows the client to compare sparse track fragments to identify previously received fragments. Continuing in block 450, the component requests the referenced sparse track fragment. For example, the component may issue an HTTP request specifying a URL associated with the sparse track fragment.

Continuing in block 460, the component receives the requested sparse track fragment. For example, a server or cache may provide the fragment via an HTTP response. Continuing in block 470, the component identifies a reference to a previous sparse track fragment associated with the received sparse track fragment. For example, the HTTP response associated with the fragment may include an HTTP "Pragma" header containing a reference to the immediately previous sparse track fragment. After block 470, the component loops to block 440 to determine whether the client has previously received the referenced sparse track fragment.

After the client has retrieved the continuous fragment and each new sparse track fragment, the component continues in block 480. In block 480, the component displays any newly received sparse and continuous track fragments. For example, the client may display a video track fragment and superimpose associated text caption data from sparse track fragments. After block 480, these steps conclude.

Figure 5:
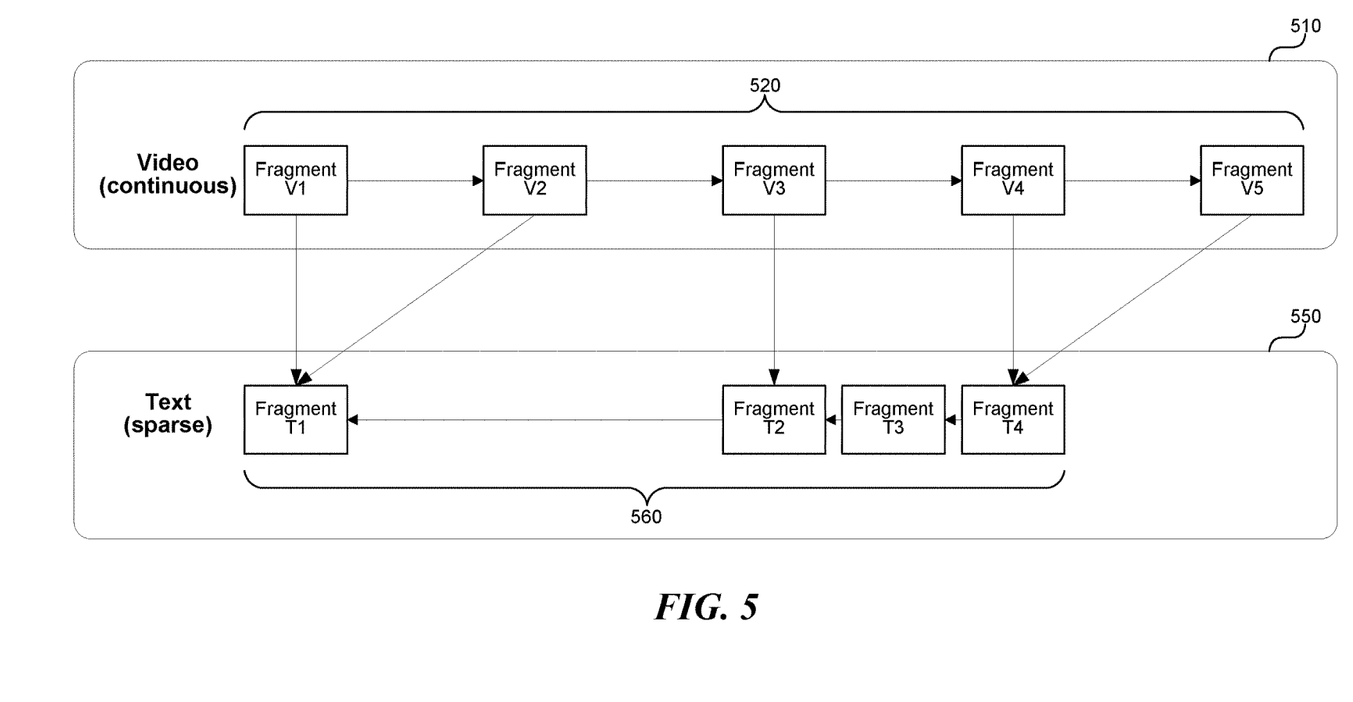
FIG. 5 is a diagram that illustrates one or more data structures used by the sparse streaming system to associate continuous and sparse fragments, in one embodiment.

FIG. 5 is a diagram that illustrates one or more data structures used by the sparse streaming system to associate continuous and sparse fragments, in one embodiment. In the diagram, fragments arrive from left to right over time, including a continuous video data stream 510 and a sparse text data stream 550. The video data stream 510 includes fragments 520 that arrive on a regular schedule over time. The text data stream 550 includes fragments 560 that arrive irregularly. Each of the video fragments 520 points to the most recent text data fragment. For example, video fragments V1 and V2 point to text fragment T1, video fragment V3 points to text fragment T2, and video fragments V4 and V5 point to text fragment T4. Each of the text fragments 560 also includes a reverse pointer to the previous text fragment. For example, text fragment T4 points to T3, T3 to T2, and T2 to T1. Forward pointers in between video track fragments are specified using a custom MP4 box in the response. Pointers to text track fragments in the video track responses are indicated in the HTTP "Pragma" header. Reverse pointers in the text track responses are also indicated using the HTTP "Pragma" header.

The diagram illustrates two situations that can occur between the video data stream 510 and the text data stream 550. First, multiple video fragments 520 may arrive between text fragments 560. This is illustrated by video fragments V1 and V2 that both point to text fragment T1. The client detects that V2 points to the same fragment as V1, and if it has already retrieved T1 after receiving V1, does not perform any additional action for the text data stream when V2 arrives. When V3 arrives, the client recognizes that V3 points to a new text fragment T2 and retrieves T2. The second situation is that multiple text data fragments may arrive between video fragments, as illustrated by T3, which arrives between V3 and V4. The reverse pointers allow the client to recognize that it needs to retrieve T3 by following the path from V4 to T4 to T3. When the client follows the path from T3 to T2, the client recognizes that T2 has already been retrieved and stops following the chain. The client can then display T3 and T4 based on any instructions or protocol associated with the text data stream 550.

The client can also perform error recovery on the text data stream 550 even if some frames of the video data stream 510 are not received. For example, if the client fails to receive V3 and V4 but receives V5, the client can follow the reference from V5 to T4, then from T4 to T3 and T3 to T2. Thus, if the text data stream includes information that the client is under contract to retrieve, but the video stream can be skipped, then the client can retrieve the missing text data stream fragments without going back and retrieving the missing video stream fragments.

In some embodiments, the sparse streaming system allows clients to view previously live content on-demand after the live event has concluded. The same continuous and sparse fragments that clients retrieved during the live event can also be retrieved by clients connecting after the event has occurred. These fragments may also be available from Internet cache servers without a particular request reaching a content network.

In some embodiments, the sparse streaming system provides multiple versions of sparse data tracks. For example, the system may provide localized versions of a track containing closed captions so that viewers having different native languages can each select a track in their own native language. Previous systems that embedded this information within a media presentation often asked clients to download an entirely different presentation to switch languages. However, the sparse streaming system allows clients to switch sparse tracks "on the fly" without affecting the video presentation. For example, while only one set of video fragments may be available in caches throughout the network, a client can request multiple different fragments for a sparse track. In addition, although a client may have been requesting sparse track fragments in English during the beginning of the presentation, the client can switch to Spanish sparse fragments at any point during the presentation without interruption.

In some embodiments, the sparse streaming system supports multiple sparse tracks associated with a particular continuous track. Each sparse track may have a different purpose, such as a highlight track (for significant events in a presentation), a closed caption track, and so forth. Each fragment in the continuous track can include a list of sparse tracks associated with the continuous track. The sparse streaming system performs the steps described further herein to retrieve sparse fragments for each of the associated sparse tracks. In some embodiments, the system labels each sparse fragment using a combination of a track name, track discriminating attributes, and a time position to allow the fragment to be reliably located by clients when failover events occur.

A highlight may include any interesting segment of media, such as a point during a sporting event during which a player scored a goal. The client can play a highlight reel after an event has concluded by playing those media fragments of the media with associated with highlight markers. If the client did not receive the live event, the client can request the manifest for the media and then request only those media fragments corresponding to the highlights. If a user wants to see more of the media before and after the highlight (e.g., as indicated by the user fast-forwarding or rewinding), then the client can request additional media fragments to play the requested portions of the media.

In some embodiments, the sparse streaming system allows a client connecting after a live event has started to catch up with sparse data previously created in association with a sparse data track. When a provider declares that a track is a "control track," the system cumulatively aggregates the track's data into the manifest downloaded by the client when playback is initiated. The content provider may have contracts or other agreements with third parties that specify that each client view particular information (e.g., an advertisement) before seeing the main presentation. The system can provide a late connecting client with information about each of the sparse fragments associated with a presentation without the client having to separately request each sparse fragment. This increases network efficiency and allows third party business logic to make decisions about whether the client retrieves each sparse fragment. In addition, clients can display a timeline of the entire event (e.g., with skip markers highlighting interesting events) after having downloaded the manifest without requesting each fragment of the presentation.

In some embodiments, the sparse streaming system allows third parties to extend the system by including custom data in sparse fragments. Note that the sparse streaming system is not particularly concerned with what data is contained in each of the sparse fragments. Thus, a particular third party can extend the system by including information that allows the third party to make particular decisions at the client. For example, a third party may want to show advertisements to clients at particular points in a presentation, or to come out of an advertisement if a particularly significant event occurs (e.g., a goal scored in a sporting event) during the presentation.

In some embodiments, the sparse streaming system receives sparse data from data sources over stateless connections. For example, a data source may connect to a content server, upload one or more fragments of sparse data, then disconnect. In previous systems, sources of data typically maintain a connection with the server for the duration of a multimedia event, consuming valuable server resources. Using the sparse streaming system, data sources can provide sparse data as sparse data is available without holding a constant connection open between the data source and the server.

In some embodiments, the sparse streaming system may include spatial information in association with sparse fragments. For example, a sparse fragment containing an advertisement may include a location where the content provider requests that the client overlay the advertisement on the main presentation (e.g., upper right quadrant). In addition, the sparse fragments may indicate at what point the sparse data will be displayed, so that the client can receive sparse data in advance of the time it is to be consumed. For example, a client may receive an advertisement three minutes into a presentation that contains instructions to play the advertisement four minutes into the presentation. The extra time may allow the client to retrieve a particular advertisement from a third party advertising and tracking provider.

In some embodiments, the sparse streaming system includes an HTTP "Pragma" header with responses for continuous tracks to specify the time position of the last known fragment for any associated sparse tracks. The system may also use the HTTP "Pragma" header to specify the reverse pointers between sparse fragments described further herein.

In some embodiments, the sparse streaming system supports inline advertising. For a live event, it may be unknown at the start of the event when commercial breaks will occur. An event coordinator may press a button during production when it is time for a commercial, causing the system to insert an advertising marker in the media stream metadata or as a sparse track. When the client receives the advertising marker, the client may request and receive media fragments associated with a previously identified advertisement. For example, the system may provide a list of potential advertisements in an initial manifest. The advertisement may be provided in media fragments similar to other media, and may not be stored at the same server that provides the live event. Upon encountering an advertisement marker, the client pauses playback of the main stream, retrieves and displays the advertisement, and then resumes playback of the main stream. Unlike previous systems that used techniques such as polling an XML file to identify new advertisements to display, advertisements become a dynamic part of a content provider's workflow using the sparse streaming system.

In some embodiments, the sparse streaming system determines which sparse tracks to provide based on a subscription or other payment model. For example, a content provider may charge more for commentary related to a live event. In this case, the system may enable or disable switching to particular sparse tracks based on whether the conditions of the payment model have been met (e.g., the user's account is current). This information may be included in the manifest provided to the client. The content provider may offer some streams free, such as a low bit rate or highlight only media, while charging for others.

The sparse streaming system may request and receive media content in a variety of encodings. In some embodiments, the sparse streaming system uses custom MP4 boxes. The Motion Picture Experts Group (MPEG) version 4 standard provides for boxes within the format that can contain custom data. The MP4 extension is the file format commonly associated with this version of content. The system may leverage boxes to include the custom metadata and media content chunks. Other media formats provide similar customization of content within a container and may be used by the system.

In some embodiments, the sparse streaming system conforms to the guidelines of the Representational State Transfer (REST) style of software architecture for distributed hypermedia systems. One concept in REST is that an application can interact with a resource by knowing only the identifier of the resource (e.g., a URI) and the action requested (e.g., retrieval), and without knowing whether there are caches, proxies, gateways, firewalls, tunnels, or anything else between the application and the server actually holding the information. Following REST guidelines allows the system to use existing Internet infrastructure and pre-existing resource-conserving techniques such as caching. Some example REST-based principles that the system implements in some embodiments include: each URI identifies exactly one response, each URI points to a server resource that is stateless and cacheable, and each URI is intuitive and uses nouns (verbs are HTTP verbs). In particular, the system may avoid making requests using query strings and may use substantially unique keys for start times that are requested via URLs.

From the foregoing, it will be appreciated that specific embodiments of the sparse streaming system have been described herein for purposes of illustration, but that various modifications may be made without deviating from the spirit and scope of the invention. For example, although certain types of sparse data have been used as examples, those of ordinary skill in the art will appreciate that the system can be used with many, diverse types of data. Accordingly, the invention is not limited except as by the appended claims.

We claim:

1. A computer-implemented method for controlling a client computer system to request sparse track fragments associated with a continuous data track, comprising:
   requesting, from a server, a continuous track fragment associated with the continuous data track of a media presentation over a network;
   receiving the continuous track fragment over the network;
   identifying a reference to a sparse track fragment associated with the continuous track fragment;
   determining that the sparse track fragment has not previously been received;

in response to the determining that the sparse track fragment has not previously been received, requesting the sparse track fragment over the network;
receiving the sparse track fragment over the network;
identifying a reference to a previous sparse track fragment in a header associated and transmitted with the sparse track fragment;
determining that the previous sparse track fragment has not previously been received;
in response to the determining that the previous sparse track fragment has not previously been received, retrieving the previous sparse track fragment over the network; and
displaying the continuous track fragment, the sparse track fragment, and the previous sparse track fragment, wherein the sparse track fragment and the previous sparse track fragment are superimposed on the continuous data track.

2. The method of claim 1, wherein identifying the reference to the sparse track fragment associated with the continuous track fragment comprises:
identifying the reference to the sparse track fragment in a header associated with continuous track fragment.

3. The method of claim 1, wherein determining that the sparse track fragment has not been received comprises:
comparing a track identifier and time stamp associated with the sparse track fragment with a respective track identifier and time stamp associated with at least one previously-received sparse track fragment.

4. The method of claim 1, wherein receiving the continuous track fragment comprises:
receiving error recovery information that allows discovering missed sparse track fragments by following a stored reference between a current sparse track fragment and a previous sparse track fragment without retrieving intervening continuous track fragments.

5. The method of claim 1, wherein receiving the continuous track fragment comprises:
receiving the continuous track fragment from a server cache.

6. The method of claim 1, wherein receiving the continuous track fragment comprises receiving a video fragment; and
wherein receiving the sparse track fragment comprises receiving a text fragment.

7. The method of claim 1, wherein the sparse track fragment includes spatial information that specifies an insertion point in the continuous track.

8. A client computer system for requesting sparse track fragments associated with a continuous data track of a media presentation, the system comprising:
a processor;
a memory comprising software, the software including instructions to cause the processor to perform the actions of:
requesting, from a server, a continuous track fragment associated with the continuous data track over a network;
receiving the continuous track fragment over the network;
identifying a reference to a sparse track fragment associated with the continuous track fragment;
determining that the sparse track fragment has not previously been received;
in response to the determining that the sparse track fragment has not previously been received, requesting the sparse track fragment over the network;
receiving the sparse track fragment over the network;
identifying a reference to a previous sparse track fragment in a header associated and transmitted with the sparse track fragment;
determining that the previous sparse track fragment has not previously been received;
in response to the determining that the previous sparse track fragment has not previously been received, retrieving the previous sparse track fragment over the network; and
displaying the continuous track fragment, the sparse track fragment, and the previous sparse track fragment, wherein the sparse track fragment and the previous sparse track fragment are superimposed on the continuous data track.

9. The system of claim 8, wherein the software further includes instructions to cause the processor to perform the action of: identifying the reference to the sparse track fragment associated with the continuous track fragment by identifying the reference to the sparse track fragment in a header associated with continuous track fragment.

10. The system of claim 8, wherein the software further includes instructions to cause the processor to perform the action of: determining that the sparse track fragment has not been received by comparing a track identifier and time stamp associated with the sparse track fragment with a respective track identifier and time stamp associated with at least one previously-received sparse track fragment.

11. The system of claim 8, wherein receiving the continuous track fragment comprises:
receiving error recovery information that allows discovering missed sparse track fragments by following a stored reference between a current sparse track fragment and a previous sparse track fragment without retrieving intervening continuous track fragments.

12. The system of claim 8, wherein the software further includes instructions to cause the processor to perform the action of: receiving the continuous track fragment from a server cache.

13. The system of claim 8, wherein the continuous track fragment comprises a video fragment and the sparse track fragment comprises a text fragment.

14. The system of claim 8, wherein the software further includes instructions to cause the processor to perform the action of: regularly requesting continuous track fragments according to one or more of a specified time interval or a quality of service (QoS) data.

15. The system of claim 8, wherein the software further includes instructions to cause the processor to perform the action of: requesting the sparse track fragment by issuing a Hypertext Transfer Protocol (HTTP) request that specifies a Uniform Resource Locator (URL) associated with the sparse track fragment.

16. The system of claim 8, wherein the sparse track fragment includes spatial information that specifies an insertion point in the continuous track.

17. A computer-readable storage device comprising instructions for controlling a client computer system to request sparse track fragments associated with a continuous data track, wherein the instructions, when executed, cause a processor to perform actions comprising:
requesting, from a server, a continuous track fragment associated with the continuous data track of a media presentation over a network;
receiving the continuous track fragment over the network;
identifying a reference to a sparse track fragment associated with the continuous track fragment;

determining that the sparse track fragment has not previously been received;
in response to the determining that the sparse track fragment has not previously been received, requesting the sparse track fragment over the network;
receiving the sparse track fragment over the network;
identifying a reference to a previous sparse track fragment in a header associated and transmitted with the sparse track fragment;
determining that the previous sparse track fragment has not previously been received;
in response to the determining that the previous sparse track fragment has not previously been received, retrieving the previous sparse track fragment over the network; and
displaying the continuous track fragment, the sparse track fragment, and the previous sparse track fragment, wherein the sparse track fragment and the previous sparse track fragment are superimposed on the continuous data track.

18. The computer-readable storage device of claim 17 wherein the sparse track fragment includes spatial information that specifies an insertion point in the continuous track.

19. The computer-readable storage device of claim 17, wherein determining that the sparse track fragment has not been received comprises:

comparing a track identifier and time stamp associated with the sparse track fragment with a respective track identifier and time stamp associated with at least one previously-received sparse track fragment.

20. The computer-readable storage device of claim 17, wherein the actions further comprise:

receiving error recovery information that allows discovering missed sparse track fragments by following a stored reference between a current sparse track fragment and a previous sparse track fragment without retrieving intervening continuous track fragments.

* * * * *